United States Patent
Lundberg et al.

(10) Patent No.: US 10,182,587 B2
(45) Date of Patent: Jan. 22, 2019

(54) HYBRID SYSTEM AND METHOD FOR PRODUCING A SUBSTANTIALLY NON-FOAMING AND FOAMING GAS-INFUSED BEVERAGES

(71) Applicant: Manitowoc Foodservice Companies, LLC, Manitowoc, WI (US)

(72) Inventors: Kenneth Lundberg, Land O'Lakes, FL (US); Paul Wesley Cochran, Coal City, IN (US); Peter Edward Boyd, Jeffersonville, IN (US); Robert R. Niederman, Floyds Knobs, IN (US); William J. Allen, II, Salem, IN (US); Aditya Jayant Angal, Louisville, KY (US)

(73) Assignee: MANITOWOC FOODSERVICE COMPANIES, LLC, New Port Richey, FL (US)

( * ) Notice: Subject to any disclaimer, the term of this patent is extended or adjusted under 35 U.S.C. 154(b) by 0 days.

(21) Appl. No.: 15/374,647

(22) Filed: Dec. 9, 2016

(65) Prior Publication Data
US 2017/0164643 A1 Jun. 15, 2017

Related U.S. Application Data

(60) Provisional application No. 62/265,317, filed on Dec. 9, 2015.

(51) Int. Cl.
*A23L 2/54* (2006.01)
*B67D 1/14* (2006.01)
(Continued)

(52) U.S. Cl.
CPC ............... *A23L 2/54* (2013.01); *A23F 5/243* (2013.01); *B67D 1/007* (2013.01); *B67D 1/0061* (2013.01);
(Continued)

(58) Field of Classification Search
CPC ......... A23L 2/54; A23F 5/243; B67D 1/0061; B67D 1/007; B67D 1/0406; B67D 1/0858;
(Continued)

(56) References Cited

U.S. PATENT DOCUMENTS 1,053,466 A 2/1913 Zuber
3,209,952 A 10/1965 Cornelius
(Continued)

FOREIGN PATENT DOCUMENTS

EP 1364909 A1 11/2003

OTHER PUBLICATIONS

International Search Report dated Mar. 27, 2017 for PCT applicatoin No. PCP/US2016/065918.
(Continued)

*Primary Examiner* — Anthony J Weier
(74) *Attorney, Agent, or Firm* — Ohlandt, Greeley, Ruggiero & Perle, LLP

(57) ABSTRACT

A system prepares and dispenses non gas-infused and gas-infused beverages including a gas source, a pressurizable container connected to the gas source to receive a first flow of gas, a gas infusion tank connected to the gas source to receive a second flow of gas, a first dispensing tap that receives a portion of preprocessed beverage stored in the pressurizable container that flows under pressure from a portion of the first flow of gas to dispense a non gas-infused beverage from the first dispensing tap, and a second dispensing tap that receives gas-infused beverage from the gas infusion vessel to dispense the gas-infused beverage by the second dispensing tap, the gas-infused tank receiving a portion of the preprocessed beverage from the pressurizable
(Continued)

container to infuse the preprocessed beverage in the gas infusion vessel with at least a portion of the second flow of gas.

16 Claims, 16 Drawing Sheets

(51) Int. Cl.
*B67D 1/08* (2006.01)
*B67D 1/16* (2006.01)
*B67D 1/00* (2006.01)
*B67D 1/04* (2006.01)
*A23F 5/24* (2006.01)

(52) U.S. Cl.
CPC ......... *B67D 1/0406* (2013.01); *B67D 1/0858* (2013.01); *B67D 1/0888* (2013.01); *B67D 1/1405* (2013.01); *B67D 1/16* (2013.01); *A23V 2002/00* (2013.01); *B67D 2001/0481* (2013.01)

(58) Field of Classification Search
CPC ...... B67D 1/0888; B67D 1/1405; B67D 1/16; B67D 2001/0481; A23V 2002/00
See application file for complete search history.

(56) References Cited

U.S. PATENT DOCUMENTS

| | | | |
|---|---|---|---|
| 4,708,827 A | | 11/1987 | McMillin |
| 4,974,500 A | * | 12/1990 | Boyd ..................... A47B 31/02 221/96 |
| 5,464,124 A | * | 11/1995 | Weyh ................. B01F 3/04787 222/129.1 |
| 6,234,349 B1 | * | 5/2001 | Bilskie ................... B67D 1/006 222/129.2 |
| 6,216,913 B1 | | 10/2001 | Bilskie et al. |
| 2004/0261443 A1 | * | 12/2004 | Crisp, III ............. B67D 1/0057 62/390 |
| 2005/0074523 A1 | * | 4/2005 | Rodriguez Santos ... A23G 9/32 426/66 |
| 2005/0082313 A1 | | 4/2005 | Fox |
| 2006/0231574 A1 | | 10/2006 | Bilskie et al. |
| 2015/0329343 A1 | | 11/2015 | Kleinrchert |
| 2017/0164643 A1 | | 6/2017 | Lundberg et al. |

OTHER PUBLICATIONS

Written Opinion dated Mar. 27, 2017 for PCT applicatoin No. PCT/US2016/065918.
JoeTap: Cold Brew Coffee Tap Systems—Standalone Dispense System for Cold Brew Coffee; "Operation Manual and User Guide"; AC Distributing, Inc.; Jul. 8, 2015; pp. 1-20.
Giller, Megan; "What's the Deal With Carbonated Coffee?"; Zagat; Jul. 15, 2014; pp. 1-2.
Anderson, Randy; "Nitrogenated Coffee Can Boost Summer Sales"; Coffee Talk; Apr. 15, 2015; pp. 1-3.
JoeTap; "Single and Double Door Dispense System for Cold Brew Coffee"; Operation Manual and User Guide; Jul. 8, 2015; pp. 1-20.
JoeTap; "Standalone Dispense System for Cold Brew Coffee"; Operation Manual and User Guide; 2015; pp. 1-22.
JoeTap; "Nitro Coffee on Tap; Operation Manual and User Guide"; Dec. 8, 2015; pp. 1-8.
Kegoutlet—Cold Brew Coffee; "How to Build a Fermenter Fridge";eBook; Dec. 7, 2015; pp. 1-7.
Rosen et al; FoxNews.com; "Nitro Coffee is the Next Big Thing to Happen to Your Morning Brew"; Sep. 22, 2015; pp. 1-2.
Haven, Leif; "What is Nitro Coffee"; Eater; Sep. 2, 2015; pp. 1-6.

* cited by examiner

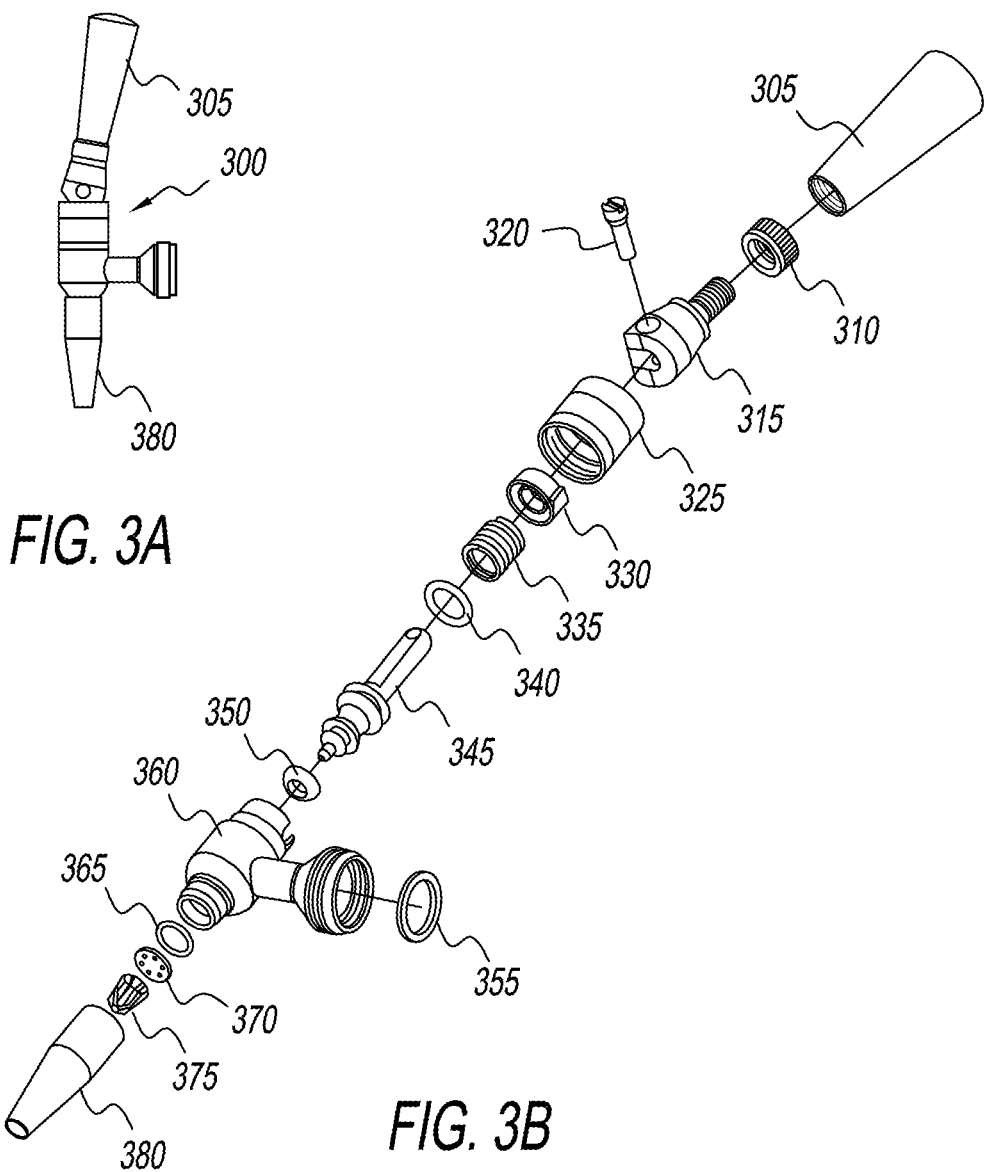

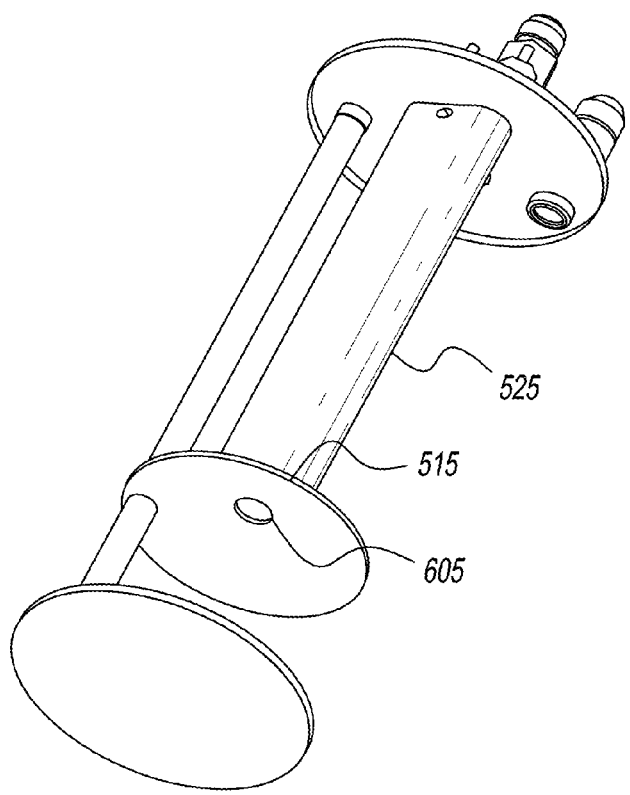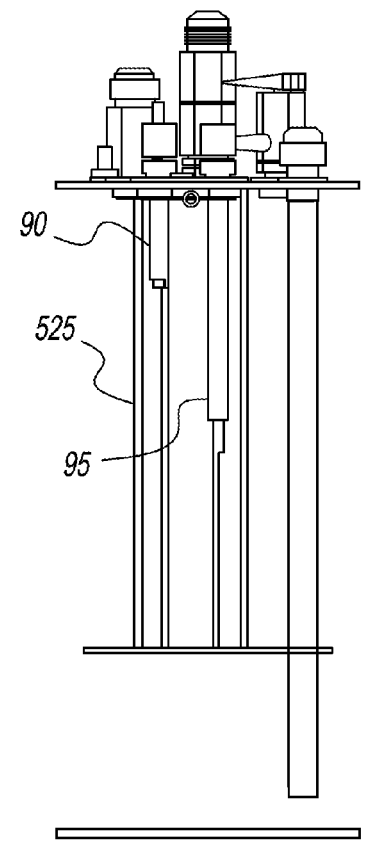
FIG. 6A
FIG. 6B

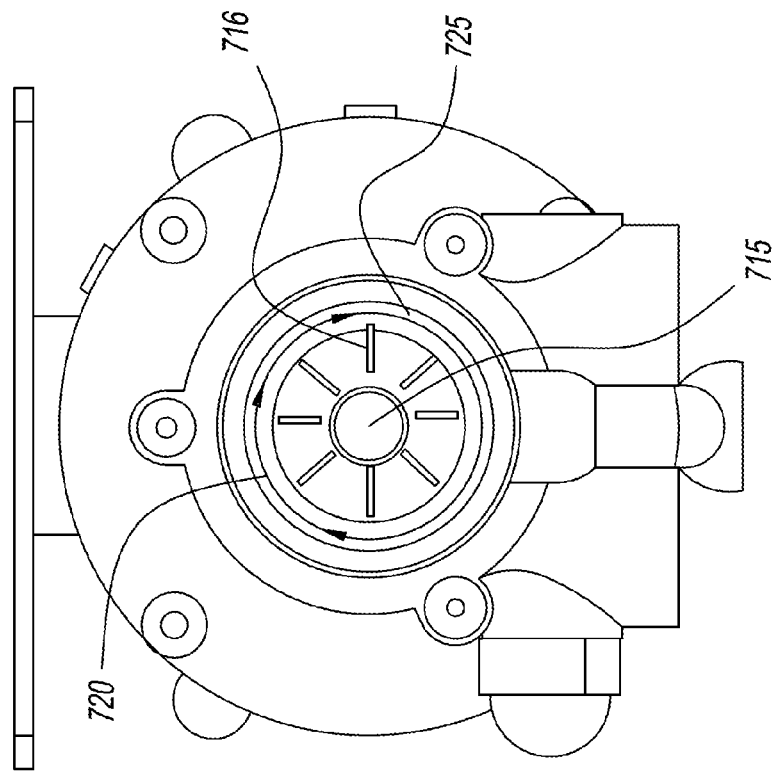
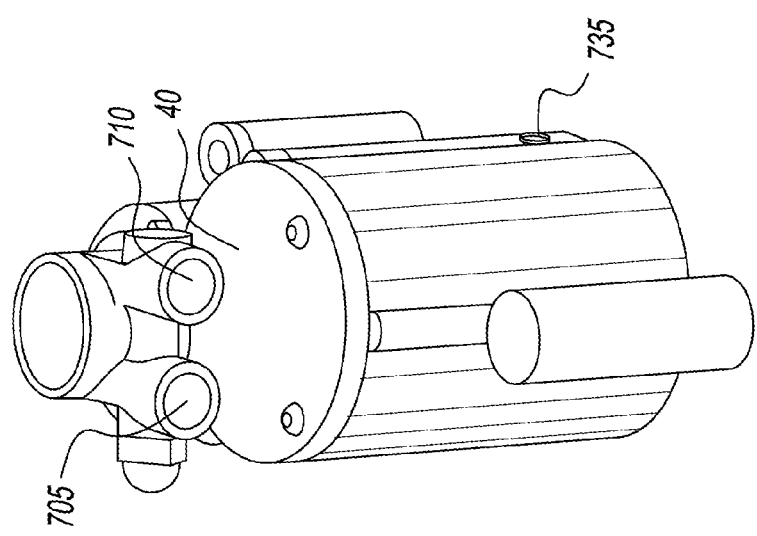
FIG. 7B
FIG. 7A

HYBRID SYSTEM AND METHOD FOR PRODUCING A SUBSTANTIALLY NON-FOAMING AND FOAMING GAS-INFUSED BEVERAGES

CROSS-REFERENCE TO RELATED APPLICATIONS

The present application claims the benefit of U.S. Provisional Application Ser. No. 62/265,317, filed Dec. 9, 2015, the entire contents of which are hereby expressly incorporated by reference.

BACKGROUND OF THE DISCLOSURE

1. Field of the Disclosure

The present disclosure relates generally to a hybrid system and a method to prepare and dispense both a substantially non-foaming and foaming gas-infused beverages. More particularly, the present disclosure relates to a system and a method to prepare and dispense both non gas-infused and gas-infused beverages while the system has a low operation pressure.

2. Description of Related Art

The use of nitrogen gas to store and dispense gas-infused beverages such as beer and soda is conventionally known. Further, infusion of other non-gas-infused beverages, such as coffee or tea, with a gas to form, for example, a carbonated beverage, is also known. However, for restaurants or commercial establishments to offer such beverages for sale to consumers, a separate system is required to infuse such beverages with a gas to form gas-infused beverages in addition to a system that dispenses the beverages themselves without infusion of gas or with a reduced infusion of gas. There are no known dual functioning integrated systems to dispense both non gas-infused beverages, such as non gas-infused coffee, and beverages infused with an amount of gas that is greater than the non gas-infused beverages forming the gas-infused beverages, such as gas-infused coffee, for example, nitrogenated coffee. Moreover, to develop such a dual functioning integrated system presents many challenges relating to regulating pressure in the system: (1) to avoid undesirable gas levels and foams in the non gas-infused beverage, and (2) backflow from the gas infusion vessel into the non gas-infused beverage stream. A sufficient pressure is present to accomplish infusing preprocessed beverage with a gas forming a gas-infused beverage that is then flowed to a dispenser to dispense the gas-infused beverage. In addition, a sufficient pressure is present to generate a flow of the non gas-infused beverage to a dispenser to dispense the non gas-infused beverage. If a non gas-infused beverage is provided from a single source, it is ensured that (1) the non gas-infused beverage is received by a dispenser to dispense the non gas-infused beverage at an acceptable low pressure to dispense the non gas-infused beverage, and (2) that the non gas-infused beverage is received by a gas infusion vessel for infusion of the non gas-infused beverage with additional gas at a sufficient pressure to allow for gas infusion of the non gas-infused beverage, thereby forming an gas-infused beverage with an increased level of gas to produce a dispensed beverage with desirable foaming.

Accordingly, there is a need for a system or a method that prepares and dispenses both non gas-infused and gas-infused beverages.

SUMMARY

A system and a method to prepare and dispense both non gas-infused and gas-infused beverages is provided.

A hybrid system to prepare and dispense both reduced non-foaming gas-infused and foaming gas-infused beverages comprises a gas source, a pressurizable container connected to the pressurize gas source to receive a first flow of gas from the gas source, a gas infusion vessel connected to the gas source to receive a second flow of gas from the gas source, a first dispensing tap that receives a portion of preprocessed beverage stored in the pressurizable container that flows under pressure applied from a portion of the first flow of gas to dispense a non gas-infused beverage from the first dispensing tap, and a second dispensing tap that receives an gas-infused beverage from the gas infusion vessel to dispense the gas-infused beverage by the second dispensing tap, the gas infusion vessel receiving a portion of the preprocessed beverage from the pressurizable container to infuse the preprocessed beverage in the gas infusion vessel with at least a portion of the second flow of gas.

The system is located in a refrigeration cabinet to cool down both the non gas-infused and gas-infused beverages.

The system further comprises a pump to drive preprocessed beverage from the pressurizable container to the gas infusion vessel connected between the pressurizable container and the gas infusion vessel.

The system further comprises a first cutoff switch that is low gas cutoff switch that determines the pressure of gas higher or lower than a pre-determined pressure, wherein the first cutoff switch is connected between the gas source and the pressurizable container.

The system further comprises a second cutoff switch that is a low fluid detection cutoff switch to determine whether a flow rate of the preprocessed beverage is higher or lower than a pre-determined flow rate, wherein the second cutoff switch is located between the pressurizable container and the pump.

The system further comprises a first pressure regulator to regulate a pressure of the gas directly from the gas source.

The system further comprises a second pressure regulator to regulate a pressure of the gas directly to the gas infusion vessel and a third pressure regulator to regulate the pressure of gas directly to the pressurizable container.

The pressure of gas after the second pressure regulator is higher than a pressure of gas after the third pressure regulator.

The system further comprises a low tank sensor and a full tank sensor that indicate a level of the gas-infused beverage in the gas infusion vessel.

The system further comprises a beverage sink, a removable beverage sink cover with slots and a plurality of non-splash drain reliefs.

The system further comprises a plurality of tubes that is rated flexible plastic tubing that connects one or more of the gas source, the pressurizable container, the gas infusion vessel, the first dispensing tap and the second dispensing tap.

The pressurizable container of the system has a pressure relief valve to relieve the pressure before the pressurizable container is disconnected from system.

The second dispensing tap comprises a diffuser to cause foaming from the gas-infused beverage and the first dispensing tap does not comprise a diffuser.

A method comprises preparing and dispensing both non gas-infused and gas-infused beverages comprises preparing non gas-infused beverage from at least a part of preprocessed beverage stored in a pressurizable container driven by at least a portion of gas from a gas source, delivering the non gas-infused beverage to a first dispending tap through a first plurality of tubes, driving at least a portion of preprocessed beverage stored in the pressurizable container to a gas infusion vessel through a plurality of tubes, preparing gas-infused beverage by infusing the preprocessed beverage with at least a portion of gas from the gas source in the gas infusion vessel, and delivering the gas-infused beverage to a second dispensing tap through a second plurality of tubes, wherein pressure of gas from the gas source and preprocessed beverage in the first and second pluralities of tubes are regulated by a plurality of pressure regulators.

Driving the non gas-infused beverage stored in the pressurizable container to a gas infusion vessel through a plurality of tubes is by a pump, wherein operation of the pump is controlled by a first cutoff switch, and a second cutoff switch.

The method further comprises cooling down both the non gas-infused and the gas-infused beverages in a refrigeration cabinet before dispensing.

The operation of the pump is further controlled by a low tank sensor and a full tank sensor based on the amount of the gas-infused beverage in the gas infusion vessel.

The pressure of gas into the pressurizable container after a third pressure regulator is lower than the pressure of gas into the gas infusion vessel after a second pressure regulator The above-described and other advantages and features of the present disclosure will be appreciated and understood by those skilled in the art from the following detailed description, drawings and appended claims.

BRIEF DESCRIPTION OF THE DRAWINGS

FIG. 3a is a side view of a dispensing tap in assembly according to the present disclosure.

FIG. 3b is an exploded view of the dispensing tap of FIG. 3a.

FIG. 4b is a side cross-sectional view of the gas infusion vessel of FIG. 4a.

FIG. 4c is a top, side perspective view of the gas infusion vessel of FIG. 4a.

FIG. 5 is an enlarged top, side perspective view of the gas infusion vessel without the outside shell of FIG. 4a.

FIG. 6a is a perspective view of components of the gas infusion vessel without the outside shell of FIG. 5.

FIG. 6b is a cross-sectional side view of the components of the gas infusion vessel without the outside shell of FIG. 6a.

FIG. 7a is a perspective view of a pump according to the present disclosure.

FIG. 7b is a top cross-sectional view of the pump of FIG. 7a.

FIG. 8a is a front view of the pump of FIG. 7a.

FIG. 8b is a bottom view of the pump of FIG. 7a.

FIG. 8c is a side view of the pump of FIG. 7a.

DETAILED DESCRIPTION OF THE DISCLOSURE

Figure 1:
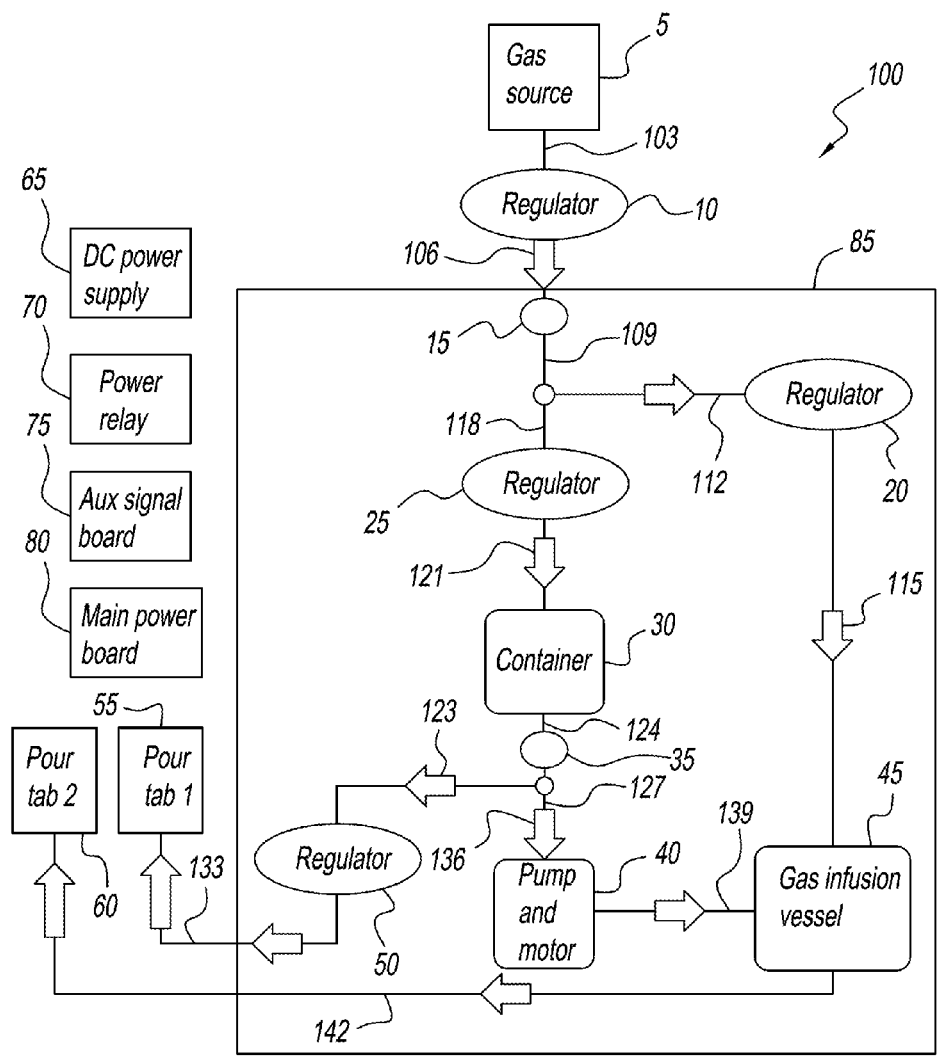
FIG. 1 is a schematic diagram of a system to prepare and dispense non gas-infused and gas-infused beverages according to the present disclosure.

Referring to FIG. 1, system 100 comprises components including a food grade gas source 5, a first pressure regulator 10, a first cutoff switch 15, a second pressure regulator 20, and a third pressure regulator 25, a pressurizable container 30, a second cutoff switch 35, a pump 40, a gas infusion vessel 45, an optional fourth pressure regulator 50, a first dispensing tap 55, a second dispensing tap 60, and a plurality of tubes, including gas tubes 103, 106, 109, 112, 115, 118, and 121, non gas-infused beverage tube 124, 127, 133, 139 and 142, operatively connected to the components. The plurality of tubes can be rated flexible plastic tubing. System 100 can prepare and dispense non gas-infused and gas-infused beverages. The non gas-infused beverage has a lower concentration of gas than the gas-infused beverage. System 100 can be within an industry standard dimensional size, for example: 36.15" tall, 26.00" wide, and 32.88" in depth, for a single unit to provide either non gas-infused or gas-infused beverages. Gas in food grade gas source 5 is supplied from an in-house gas supply via a commercially available quick connector (not shown), which is then connected to the food grade gas source 5. The pressure of gas in food grade gas source 5 can vary depending on the in-house gas supply and the strength of food grade gas source 5. In an exemplary embodiment, the pressure of gas in food grade gas source 5 is about 90 pounds per square inch ("psi") and preferably between 70 to 100 psi.

After gas exits from food grade gas source 5 through gas tube 103, the gas passes through first pressure regulator 10. First pressure regulator 10 can regulate the pressure of gas from gas tube 103 to gas tube 106. Specifically, first pressure regulator 10 can regulate the pressure of gas from 90 psi to a pressure lower than 90 psi, but higher than a pre-determined pressure threshold (e.g., 60 psi) set by first cutoff switch 15. Gas tube 106 passes from outside a refrigerated cabinet 85 into refrigerated cabinet 85. First pressure regulator 10 is mounted with food grade gas source 5. Food grade gas source 5 has two pressure gauges (not shown). The first gauge shows the pressure of the gas inside of the tank, and the second gauge shows the pressure of the gas leaving food grade tank 5. The set pressure in food grade tank 5 is 90 psi with a range of 100 psi to 70 psi or a lower pressure level, as long as system 100 still functions optimally.

Figure 16:
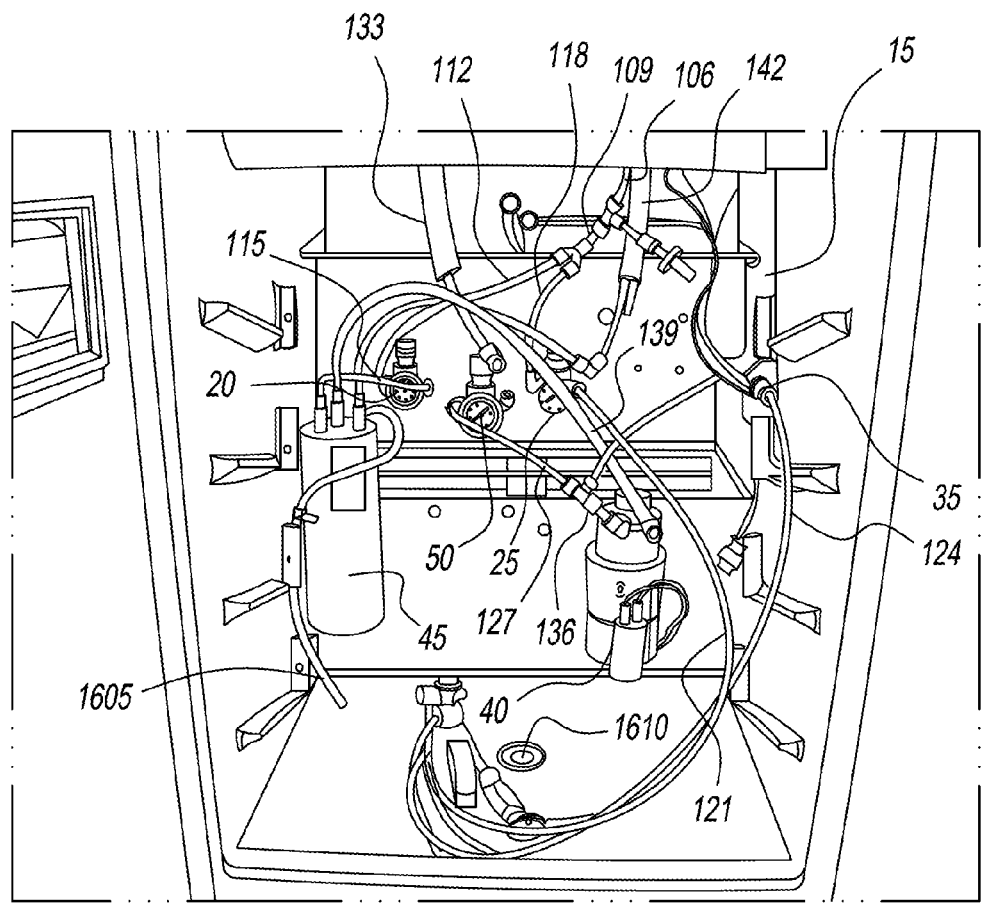
FIG. 16 is a top front perspective view of a portion of the system to prepare and dispense non gas-infused and gas-infused beverages of FIG. 1 having the door in the open position and having a pressurizable container and a pump shield removed.

Before gas enters first cutoff switch 15, the gas in gas tube 106 flows into refrigerated cabinet 85. Refrigerated cabinet 85 can be either integrated into system 100 or separate from system 100. Refrigerated cabinet 85 can cool down components inside refrigerated cabinet 85, including gas flowing through gas tube 106 and beverage disposed in pressurizable container 30. Moreover, non gas-infused beverage tube 133 and gas-infused beverage tube 142, are thermally insulated, thereby maintaining the temperature of non gas-infused or gas-infused beverages, as shown in FIG. 16. One embodiment of refrigerated cabinet 85 can have a temperature of lower than about 39 degrees Fahrenheit. The specific temperature of refrigeration cabinet 85 can be controlled with an electronic thermostat (not shown). Accordingly, the temperature of components of system 100 that are located in refrigerated cabinet 85 has a temperature in the preferable range between about 34 to 39 degrees Fahrenheit, and therefore both non gas-infused and gas-infused beverages are referred as chilled beverages. After gas enters the refrigerated cabinet 85 through gas tube 106, gas flows to first cutoff switch 15.

First cutoff switch 15 is a safety device that controls the operation of pump 40, depending on the pressure of gas measured in first cutoff switch 15 that is compared to a pre-determined pressure threshold. One exemplary embodiment of first cutoff switch 15 is a low gas cutoff switch. When the pressure of gas is lower than the pre-determined pressure threshold, for example, 60 psi, low gas cutoff switch 15 opens, thereby preventing power from being transmitted to a power relay 70 (see FIG. 2).

Power relay 70 is a device that is used to transfer the power of a main power board 80 to pump 40.

When low gas cutoff switch 15 prevents power from being transmitted to power relay 70, power relay 70 de-energizes, which in turn deactivates pump 40. However, when the pressure of the gas in gas tube 106 is the same as or above a first predetermined pressure threshold, for example, at 16 psi or above, gas in gas tube 106 passes through low gas cutoff switch 15 into gas tube 109.

After gas passes through low gas cutoff switch 15, gas flows from gas tube 109 to both second pressure regulator 20 via gas tube 112 and third pressure regulator 25 via gas tube 118.

When gas flows to third pressure regulator 25 via gas tube 118, the pressure of the gas is adjusted such that it is lower than a second predetermined pressure threshold. For example, the pressure of gas after it passed through third pressure regulator 25 is about 15 psi. Accordingly, gas enters pressurizable container 30 at a pressure of 15 psi via gas tube 121.

Pressurizable container 30 is a sealable receptacle that holds liquid, for example, preprocessed beverage made in a separate beverage maker, and includes a gas inlet and a liquid outlet for beverage. Preprocessed beverage is poured into pressurizable container 30 and can be pressurized by the gas from food grade gas source 5. The preprocessed beverage is, for example, coffee. The preprocessed beverage can be in pressurizble container 30 for 12-24 hours.

When the gas has a pressure of 15 psi, the gas after third pressure regulator 25 can force preprocessed beverage out of pressurizable container 30. Accordingly, preprocessed beverage flows to low fluid level detection switch 35.

Low fluid detection switch 35 is also a safety protection device for operation of pump 40. Low fluid detection switch 35 can be a switch to detect either a mass flow rate or a volumetric flow rate of preprocessed beverage in non gas-infused tube 124. Low fluid detection switch 35 can detect whether the flow rate is lower or higher than a pre-determined flow rate of preprocessed beverage. For example, when low fluid level detection switch 35 cannot detect any preprocessed beverage or can detect a volumetric flow rate lower than the pre-determined flow rate of preprocessed beverage, low fluid level detection switch can send a signal 224 (see FIG. 2) to an auxiliary signal board 75 not to allow pump 40 to be energized or to deactivate pump 40. Thus, to avoid an issue that pump 40 can continue running even though there is no beverage in pressurizable container 30, when low fluid detection switch 35 of non gas-infused beverage tube 124 does not detect any fluid flow, it will send a signal that causes the main board not to allow the pump to operate again until low fluid detection switch 35 can detect fluid flow, e.g., preprocessed beverage, again.

Auxiliary signal board 75 is a signal conditioning device, and can de-energize power relay 70.

When low fluid level detection switch 35 detects a preprocessed beverage with a flow rate same as or higher than the pre-determined flow rate of preprocessed beverage, low fluid detection switch 35 can send signal 224 to auxiliary signal board 75 to energize relay to provide power to pump 40.

After preprocessed beverage exits from low fluid detection switch 35, the preprocessed beverage enters a non gas-infused beverage tube 127. The gas flow from gas tube 121, through pressurizable container 30 and can force preprocessed beverage through beverage tube 127. The preprocessed beverage is maintained as non gas-infused beverage that is also cooled by refrigeration cabinet 85 to form chilled beverage. Non gas-infused beverage in beverage tube 127 after low fluid detection switch 35 can flow to first dispensing tap 55 via a non gas-infused beverage tube 127 and/or can flow to pump 40 via a non gas-infused beverage tube 136. Alternatively, non gas-infused beverage in beverage tube 127 after low fluid detection switch 35 can flow to fourth pressure regulator 50 via a non gas-infused beverage tube 127; however, fourth pressure regulator 50 is optional for system 100.

Pump 40 is a mechanical pump that can drive non gas-infused beverage from a non gas-infused beverage tube 139 to gas infusion vessel 45. A low tank sensor 95 and a full tank sensor 90 can further control operation of pump 40 (see FIG. 2). Low tank senor 95 and full tank sensor 90 are safety devices to control pump 40. When gas infusion vessel 45 contains a small amount of beverage and has available space for incoming non gas-infused beverage via non gas-infused beverage tube 139 and incoming gas via gas tube 115, low tank sensor 95 sends a signal 239 to main power board 80 to activate pump 40. However, when full tank sensor 90 detects that gas infusion vessel 45 is full or near full and has very limited space for incoming non gas-infused beverage via non gas-infused beverage tube 139 and incoming gas via gas tube 115, full tank sensor 90 can send a signal 236 to main power board 80 to shut off pump 40.

When pump 40 is activated, non gas-infused chilled beverage goes to gas infusion vessel 45 via non gas-infused beverage tube 139. Non gas-infused chilled beverage becomes sprayed soon after entering gas infusion vessel 45 with an aerator or atomize device (not shown) for rapid infusion. Thus, sprayed non gas-infused beverage is infused with the gas under the pressure that enters gas infusion vessel 45 from gas tube 115.

Gas from second pressure regulator 20 is set to have a higher pressure than the pressure after third pressure regulator 25. For example, the pressure of gas after second pressure regulator 20 can be 32 psi, and the pressure of gas after third pressure regulator 25 can be 15 psi. The pressure after third pressure regulator 25 is lower than the pressure after second pressure regulator 20 to reduce the operation pressure of system 100.

The gas from second pressure regulator 20 can be infused with non gas-infused beverage from pump 40 to prepare gas-infused beverage. The gas-infused beverage then travels through gas-infused beverage tube 142 to a second dispensing tap 60. Gas-infused beverage can be dispensed from second dispensing tap 60.

Non gas-infused beverage can also be dispensed from first dispensing tap 55. Specifically, preprocessed beverage can be dispensed without going through the gas infusion process in gas infusion vessel 45. When preprocessed beverage that is the non gas-infused beverage comes from pressurizable container 30, passes through the low fluid detection switch 35, and enters fourth pressure regulator 50 via a non gas-infused beverage tube 123, fourth pressure regulator 50 can further regulate the pressurized non gas-infused beverage to a lower pressure than the pressure of gas in non gas-infused beverage tube 123. For example, the pressure of non gas-infused beverage after fourth pressure regulator 50 can be set to 12 psi. Non gas-infused beverage goes to first dispensing tap 55 via non gas-infused beverage tube 133. Accordingly, non gas-infused beverage can be dispensed from first dispensing tap 55.

Non gas-infused beverage pouring from dispensing tap 55 can be poured faster or slower than a desired pouring rate from dispensing tap 60. In order to achieve a similar flow rate to that of the gas-infused beverage, fourth pressure regulator 50 can further regulate the pressure of non gas-infused beverage going to dispensing tap 55.

In another embodiment of the present disclosure, fourth pressure regulator 50 can be eliminated. Accordingly, fourth pressure regulator 50 is optional. Non gas-infused beverage can enter first dispensing tap 55 after low fluid detection switch 35. The functions performed by fourth pressure regulator 50 can be achieved with third pressure regulator 25.

Figure 2:
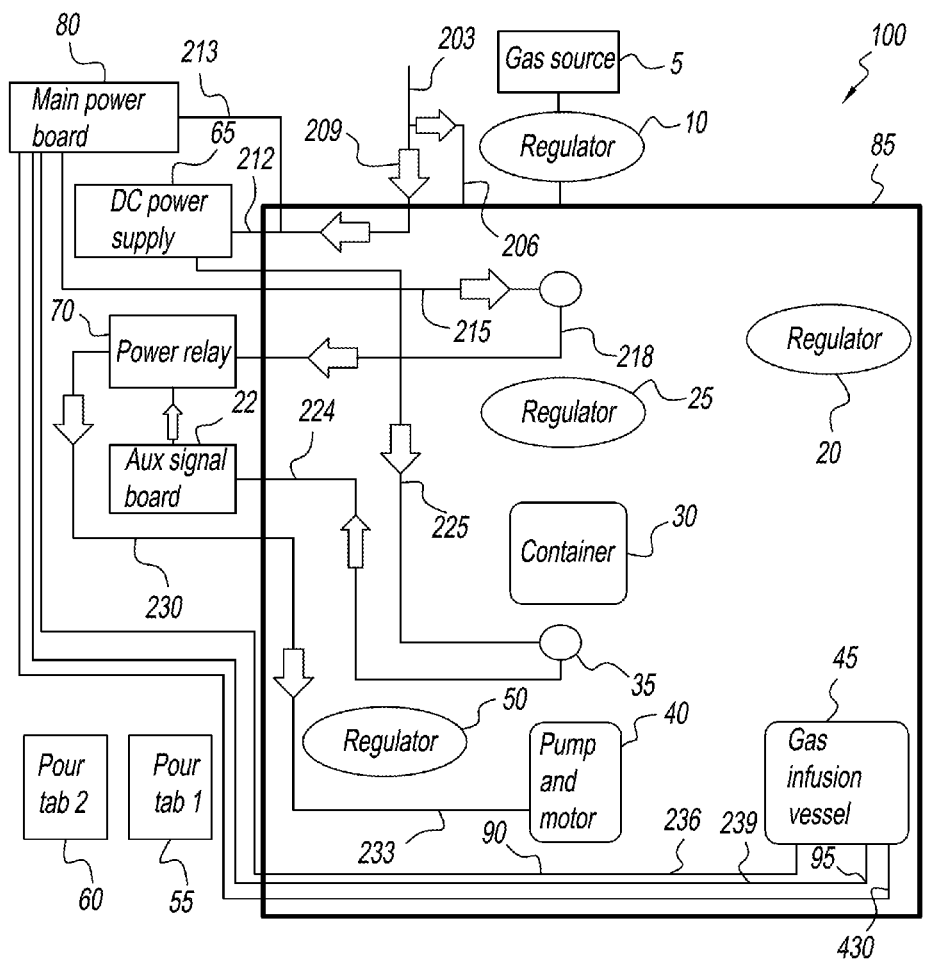
FIG. 2 is a schematic control diagram of electrical power for the system to prepare and dispense non gas-infused and gas-infused beverages of FIG. 1.

Referring to FIG. 2, incoming power 203 comes into system 100 and has a first branch 206 to supply power for refrigeration cabinet 85, a second branch 209 supplies power to the main board 80 and DC power supply. Line 209 has a first branch 212 to be DC power supply 65, and a second branch 213 to supply power for main power board 80.

As described above, low gas cutoff switch 15 is a safety device to control operation of pump 40. Main power board 80 provides power to low gas cutoff switch through a power cable 215. When low gas cutoff switch 15 detects the pressure in gas tube 106 lower than the first predetermined pressure threshold, low gas cutoff switch 15 can provide a signal 218 not to provide the power to power relay 70. When power relay 70 is not energized, power is not transferred power 230 to pump 40, which is driven by a motor. When low gas cutoff switch 15 detects that the pressure in gas tube 106 is the same as or higher than the first predetermined pressure threshold, low gas cutoff switch 15 can provide the power to power relay 70. Power relay 70 can transfer power to pump 40, as shown by 230, so that pump 40 can be activated.

Figure 13:
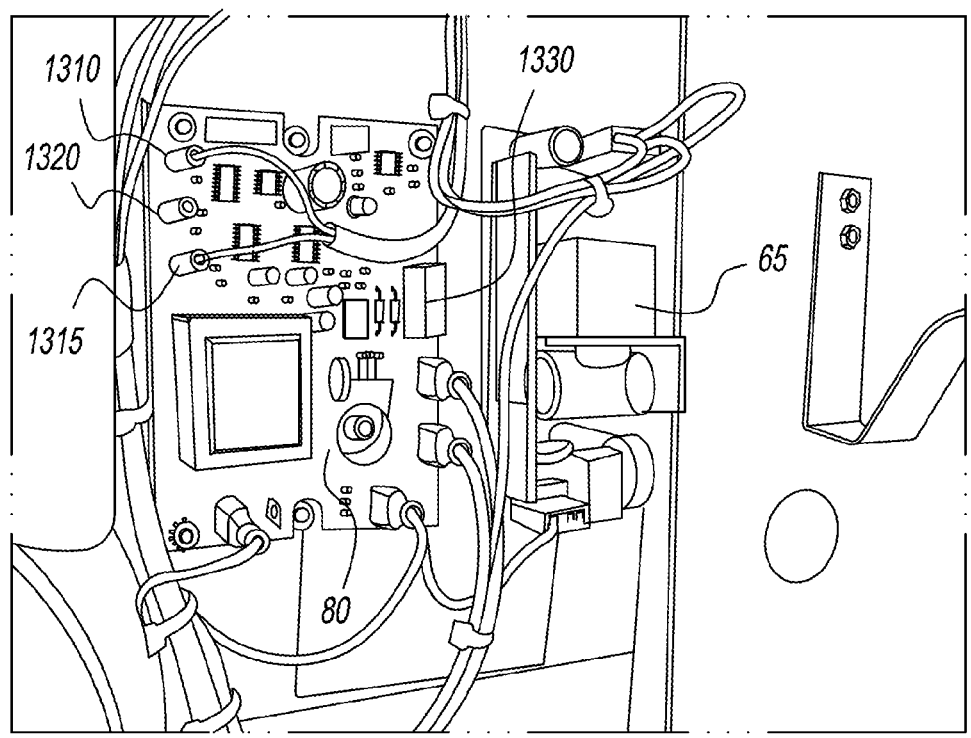
FIG. 13 shows a power controller of the system to prepare and dispense non gas-infused and gas-infused beverages of FIG. 1.

Further, DC power supply 65 can send power to low fluid level detection switch 35 through a power line 225. An exemplary embodiment of DC power supply can have a voltage of 24 volts, as shown in FIG. 13. When DC power supply 65 supplies power for low fluid level detection switch 35, low fluid level detection switch 35 can send a low fluid level signal 224 to auxiliary signal board 75, depending on the flow rate in tube 124 and the predetermined flow rate level set by low fluid level detection switch 35. Specifically, when low fluid level detection switch 35 detects a flow rate of non gas-infused beverage lower than the predetermined flow rate level, it can send low fluid level signal 224 and notify auxiliary signal board 75 not to send power to power relay 70. However, when the fluid rate level of non gas-infused beverage is the same as or higher than the predetermined level, auxiliary signal board 75 will energize power relay 70, transferring power to pump 40.

Figure 4A:
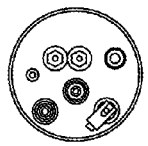
FIG. 4a is a top view of a gas infusion vessel according to the present disclosure.
Figure 4B:
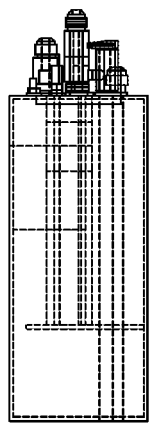
Figure 4C:
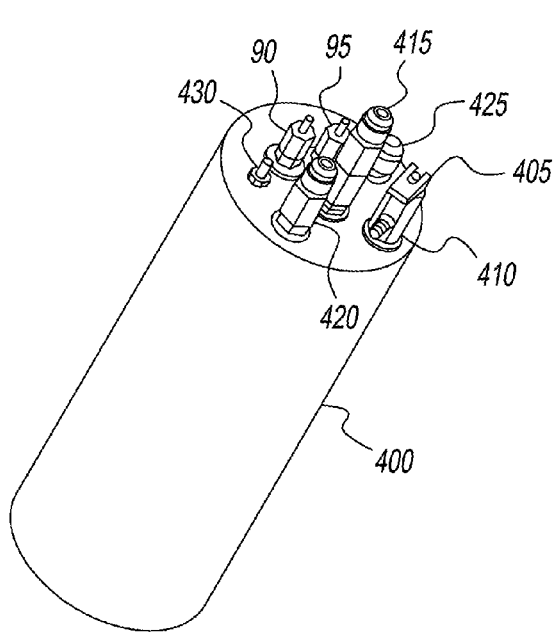
Figure 9:
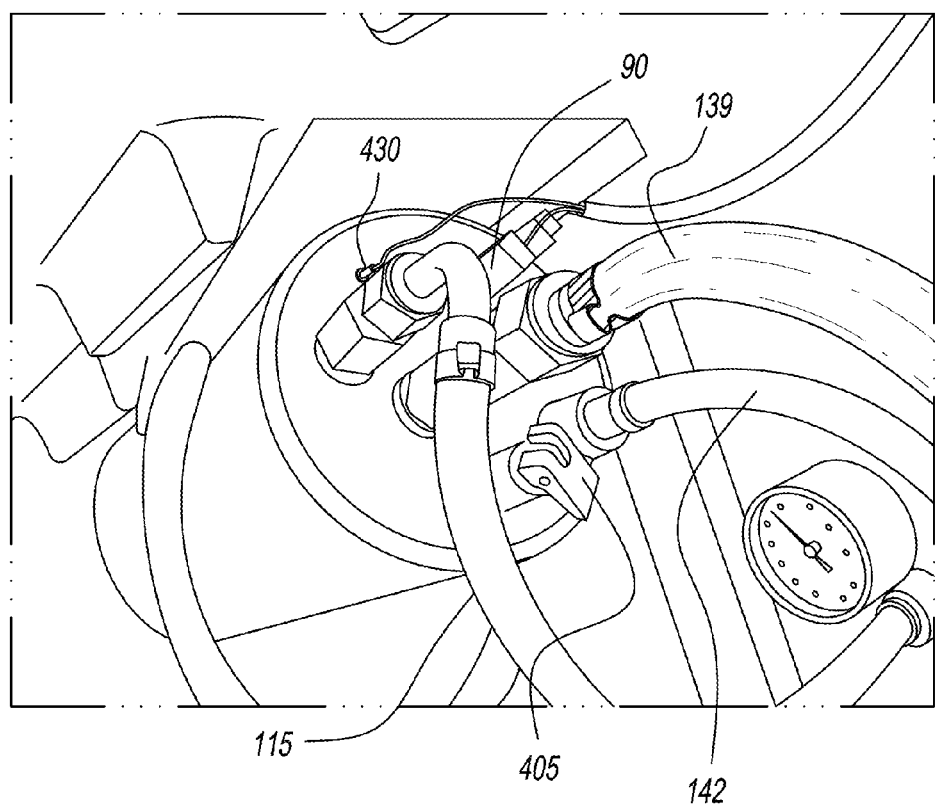
FIG. 9 shows the gas infusion vessel in the system to prepare and dispense non gas-infused and gas-infused beverages of FIG. 1.

Additionally, main power board 80 provides power to low tank sensor 95, full tank sensor 90, as shown in FIGS. 4c, 9 and 13. Low tank senor 95 and full tank sensor 90 can be external sensors to be installed with gas infusion vessel 45, or they can be integral parts of gas infusion vessel 45. One exemplary of embodiment is that low tank sensor 95 and full tank sensor 90 are parts of gas infusion vessel 45.

When low tank sensor 95 does not detect any beverage, or when the amount of liquid is very small in gas infusion vessel 45, low tank sensor 95 can send a signal to main power board 80 to turn pump 40 on. When full tank sensor 90 detects beverage, pump 40 will be off and will not be turned on until low tank sensor 95 does not detect fluid.

Referring to FIGS. 3a and 3b, a dispensing tap 60 comprises a handle 305, a marker nut 310, a handle lever 315, a screw pin 320, a cap 325, a spring retainer 330 to hold a spring 335, an o-ring 340, a plunger 345, a d-ring 350, a faucet 360, a gasket 355, an o-ring 365, a exploder plate 370, a flow straightener 375, and a nozzle 380. Faucet 360 is connected with either non gas-infused beverage tube 133 or gas-infused beverage tube 142 (see FIG. 1). In the normally closed position, tap handle 305 is coaxially aligned with nozzle 380, spring 335 pushes plunger 345 down and no beverage can be dispensed. When tap handle is off from the normally closed position, spring 335 is uncompressed and plunger 345 moves in a direction towards handle, in other words the up direction, and beverage can be dispensed from nozzle 380.

Tap 55 and tap 60 are significantly similar. The difference between tap 55 and tap 60 is that tap 55 does not have a diffuser, including, for example, exploder plate 370 and flow straighter 375. For tap 55, because the gas content in beverage is not high, there is no need to have a diffuser, including exploder plate 370 and flow straighter 375, which causes foaming from the beverage. Tap 60 has a diffuser, including exploder plate 370 and flow straighter 375.

Figure 10:
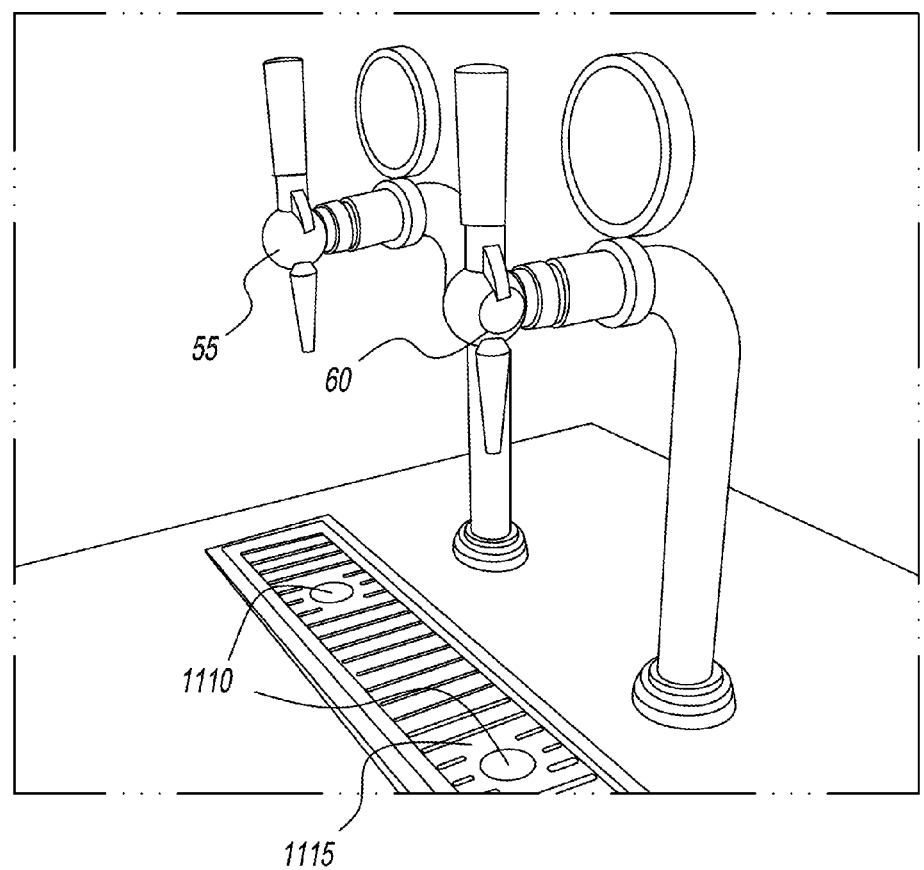
FIG. 10 shows first and second dispensing taps in the system to prepare and dispense non gas-infused and gas-infused beverages of FIG. 1.
Figure 11:
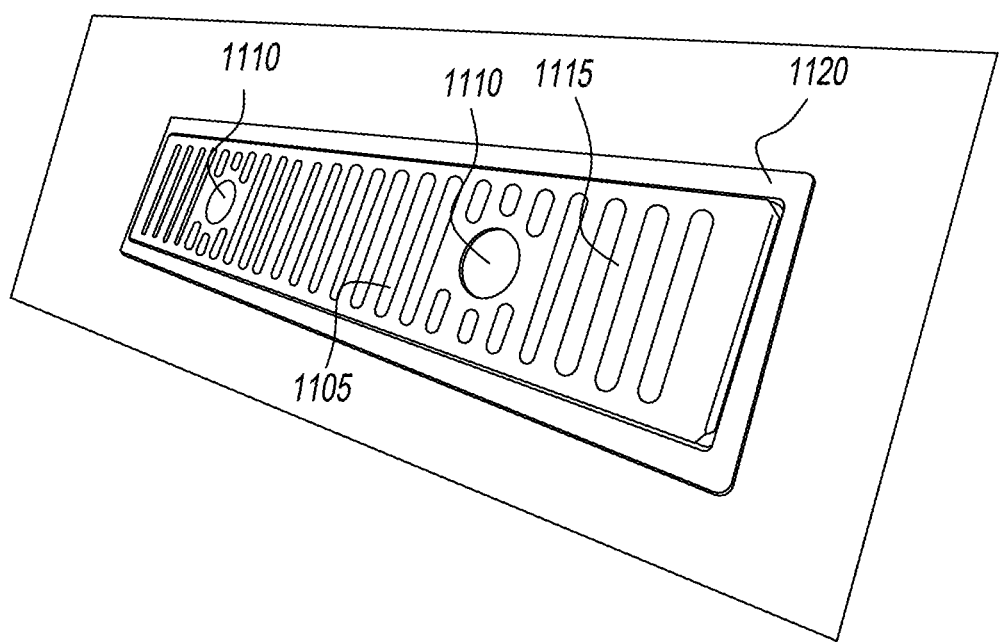
FIG. 11 shows a drain system for dispensed beverage of the system to prepare and dispense non gas-infused and gas-infused beverages of FIG. 1.

When beverage is dispensed from nozzle 380, it may spill over a cup. To avoid the splash, system 100 can further comprise a drain system for beverage dispensed from nozzle 380. For example, in FIGS. 10 and 11, system 100 further can comprise two non-splash drain reliefs 1110, a beverage sink 1120, a removable beverage sink cover plate 1115 with slots 1105.

Referring to FIGS. 4a, 4b and 4c, gas infusion vessel 45 comprises a closed vessel 400 that can store liquid, a pressure relief valve 405, a pressure relief valve adaptor 410, a beverage outlet 415, a gas inlet 420, a beverage inlet 425, low tank sensor 95, a ground probe 430, full tank sensor 90, a check valve 420 and a double check valve 425. Because gas infusion vessel 45 is a closed system, when non gas-infused beverage is delivered to vessel 400, the pressure inside vessel 400 will increase. Pressure relief valve 405 is to relieve the overpressure and prevents pressure building up in gas infusion vessel 45. When the pressure in gas infusion vessel 45 is higher than a threshold pressure, gas will be released from vessel 400 via pressure relief valve 405. For example, the pressure threshold can be 40 psi. Pressure relief valve 405 can be connected with vessel 400 with pressure relief valve adaptor 410. Further, pressure relief valve 405 can be a manual pressure relief valve, as shown in FIG. 9. Check valve 420 and double check valve allow beverage flow from pressurizable container 30 to gas infusion vessel 45 and prevent the beverage from flowing back from gas infusion vessel 45 to pressurizable container 30.

Figure 5:
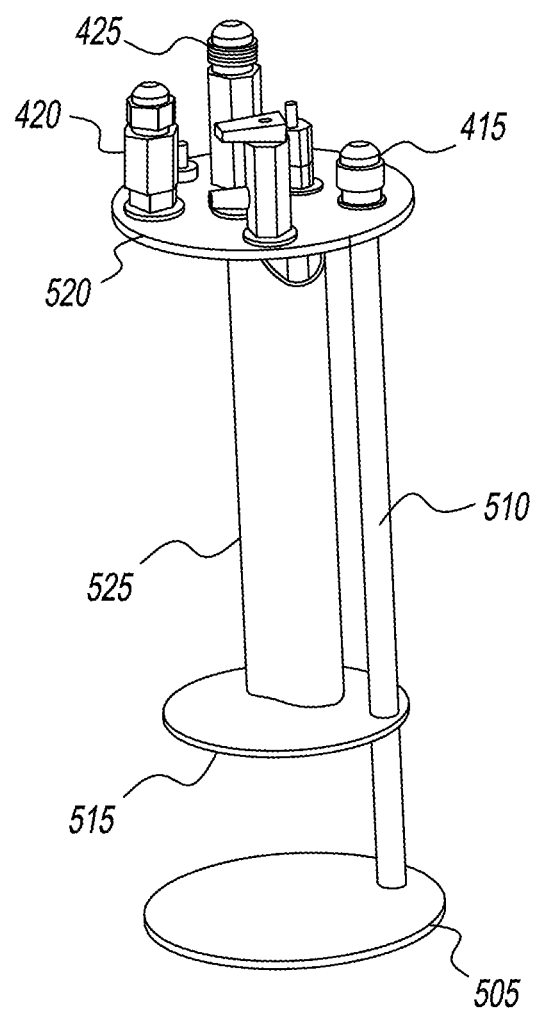

Referring to FIGS. 5, 6a and 6b, the outside shell of vessel 400 is removed for clarification. In FIG. 5, gas infusion vessel 45 further comprises a bottom plate 505, a tube 510, a separation shelf 515 to diffuse incoming beverage, a top plate 520 and an enclosure 525 to cover both high tank sensor 90 and low tank sensor 95. The outside diameter of separation shelf 515 is smaller than the inside diameter of the outside shell of vessel 400. Because the non gas-infused beverage can be sprayed by separation shelf 515, non gas-infused beverage can be infused with gas from gas inlet 420. Accordingly, the gas concentration in the non gas-infused beverage will be increased, and non gas-infused beverage becomes gas-infused beverage. After non gas-infused beverage is infused with gas from gas inlet 410, gas-infused beverage is pushed from bottom plate 505 to beverage outlet 415 through tube 510.

Referring to FIGS. 6a and 6b, high tank sensor 90 and low tank sensor 95 are both located inside enclosure 525. Separation shelf 515 comprises a hole 605. Beverage can enter and exit enclosure 525 through hole 605. Accordingly, high tank senor 90 and low tank sensor 95 can detect the amount of beverage in gas infusion vessel 45. In FIG. 6b, enclosure 525 is hidden for a clear view of low tank sensor 95 and high tank sensor 90 inside enclosure 525.

Referring to FIGS. 7a and 7b, pump 40 comprises a fluid inlet 705, a fluid outlet 710, a shaft 715 that is connected to vanes 716, and a fluid channel 725. Shaft 715 can be driven by an electrical motor 735. The fluid in pump 40 can flow along fluid channel 725 in the direction of flow 720. The fluid can be non gas-infused beverage. The non gas-infused beverage enters pump 40 through fluid inlet 705 to flow into fluid channel 725. Rotation of vanes 716 by shaft 715 generates a flow of the beverage that is between vanes 716 in a direction as shown by arrows A from fluid inlet 705 through fluid outlet 710.

Figure 8A:
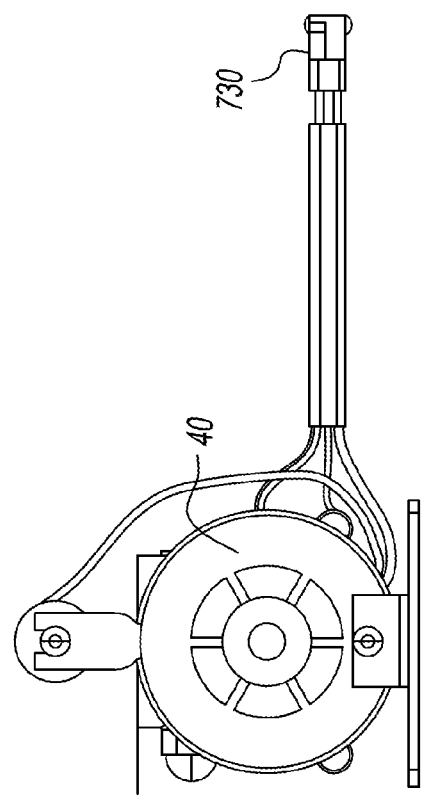
Figure 8B:
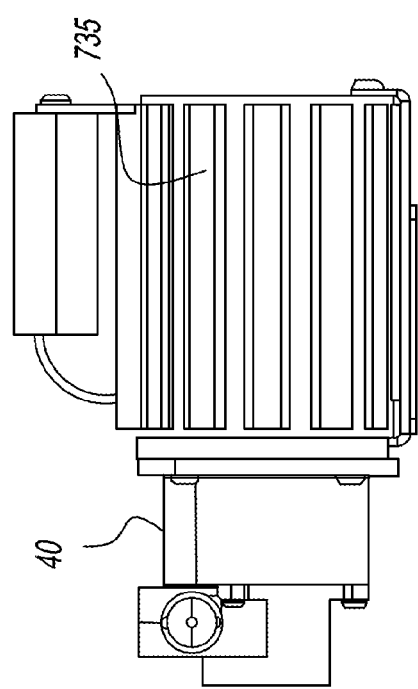
Figure 8C:
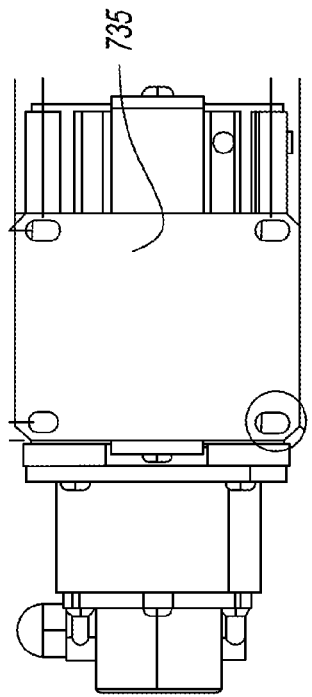

FIGS. 8a, 8b and 8c further show front, bottom, side view of a pump. Pump 40 can be a mechanical pump. Specifically, in an exemplary embodiment, pump 40 can be a rotatory vane pump driven by an electrical motor 735, as discussed above. Pump 40 has a connector 730 to receive power for pump 40, as shown by 233 in FIG. 2.

Figure 12:
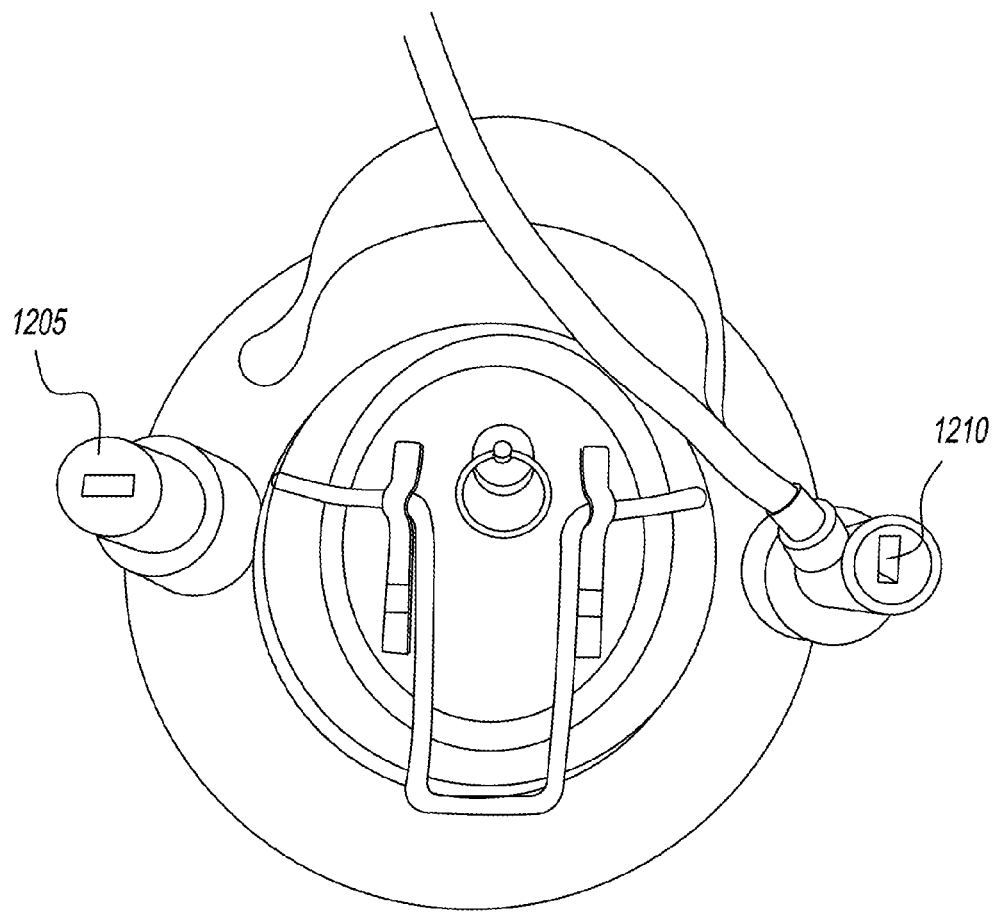
FIG. 12 shows a quick connector fitting of a pressurizable container of the system to prepare and dispense non gas-infused and gas-infused beverages of FIG. 1.

Referring to FIG. 9, the plurality of tubes can be rated flexible plastic tubing. For example, inlet gas tube 115 and non gas-infused beverage tube 139 from pump 40 to gas infusion vessel are rated flexible plastic tubing. Referring to FIG. 12, in one exemplary embodiment of the present disclosure, pressurizable container 30 can be removable, and can be connected and disconnected with system 100 with quick connector fitting within one minute. A pressure relief valve (not shown) is installed with pressurizable container 30 for safety operation. Specifically, before pressurizable container 30 is disconnected with system 100, the pressure relief valve can be controlled to relieve the pressure of the gas inside pressurizable container 30 to a pressure level safe to an operator.

Referring to FIG. 12, there are two quick ball check self sealing disconnects 1205 and 1210. Black quick disconnect 1205 supplies beverage to tap 55 and 60, and it may be connected or disconnected after white quick disconnect 1210. White quick disconnect 1210 can allow gas come in from gas source 5.

Referring to FIG. 13, a pump controller for operation of pump 40 comprises power board 80, DC power supply 65, and low tank sensor input 1315, full tank sensor input 1310, and ground probe input 1320. Further, a panel 1330 can cover the entire area of the pump controller. DC power supply 65 can be a 24-volt DC power supply.

Figure 14:
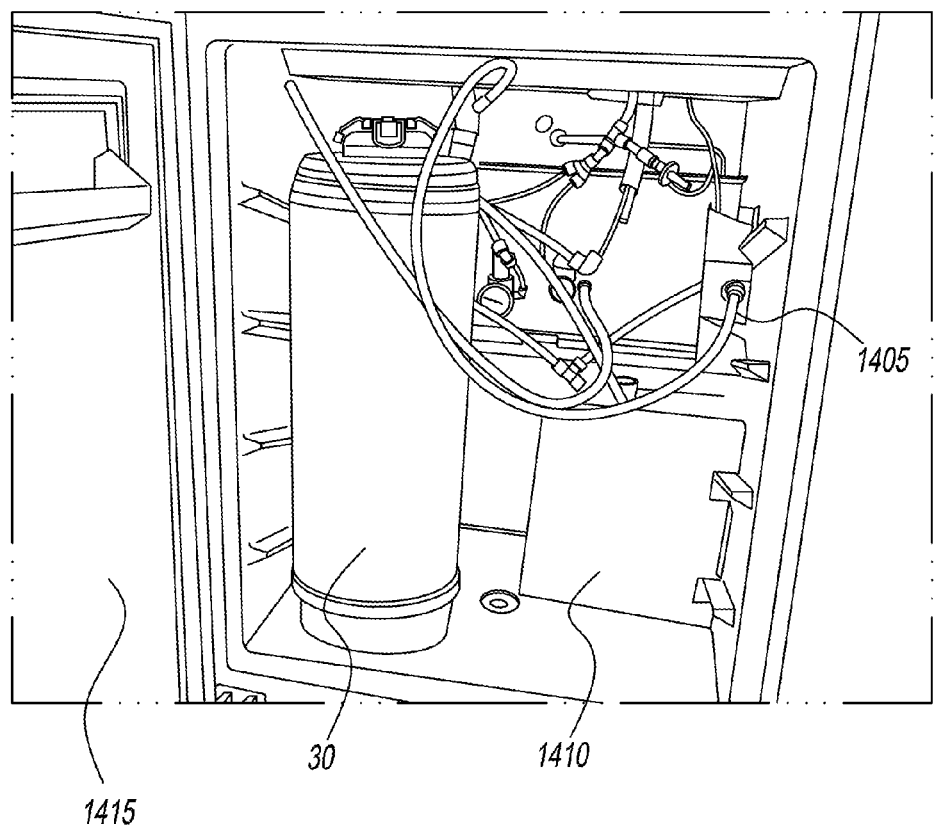
FIG. 14 is a top front perspective view of a portion of the system to prepare and dispense non gas-infused and gas-infused beverages of FIG. 1 having a door in an open position and having a pressurizable container that holds five gallons of liquid.
Figure 15:
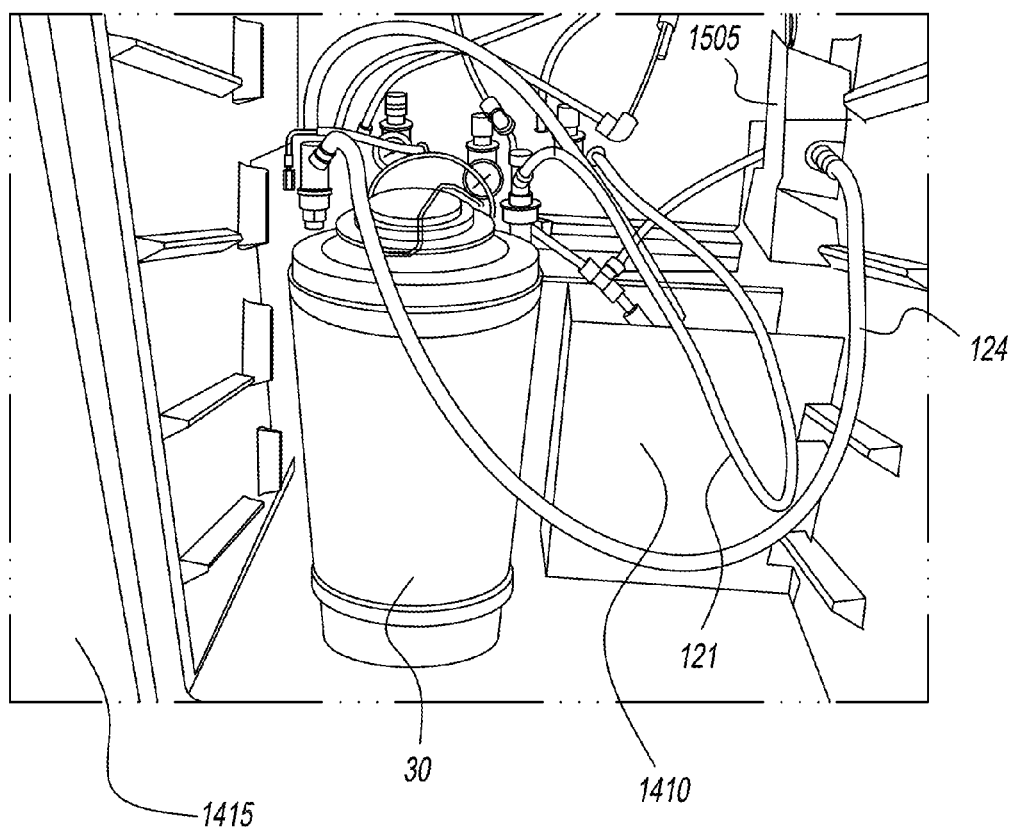
FIG. 15 is a top front perspective view of a portion of the system to prepare and dispense non gas-infused and gas-infused beverages of FIG. 1 having the door in the open position and having a pressurizable container that holds two and a half gallons of liquid.

Referring to FIGS. 14 and 15, in one exemplary embodiment of the present disclosure, pressurizable container 30 can have different volume sizes. For example, pressurizable container 30 in FIG. 14 can have a volume for 5-gallon beverages, and pressurizable container 30 in FIGS. 15 and 16 can have a volume for 2.5-gallon beverages. Pressurizable container 30 is removable by opening a door 1415 of system 100 disconnecting gas tube 121 and non gas-infused beverage tube 127 from pressurizable container 30. Pressurizable container 30 is connected in system 100 by opening door 1415 of system 100 and connecting gas tube 121 and non gas-infused beverage tube 127 to pressurizable container 30.

Further, system 100 can be on casters, and can be moved by a single adult person.

Furthermore, low gas cutoff switch 15, low fluid detection switch 35 and pump 40 of system 100 can have shields built around these sensors to protect those components and operators. For example, in FIG. 14, a pump shield 1410 is to shield the pump, and a low fluid detection sensor shield 1405 can shield low fluid detection sensor 35. In FIG. 15, a low gas cutoff switch shield 1505 can shield the noise to low gas cutoff switch sensor 15.

The process of preparing and dispensing non gas-infused beverage and gas-infused chilled beverage is achieved by pumping non gas-infused beverage from pressurizable container 30 to gas infusion vessel 45 where at least a portion of the gas from food grade gas source 5 is infused into the beverage. Gas infusion vessel 45 connects to second dispensing tap 60 that can pour gas-infused beverage. Preprocessed beverage from pressurizable container 30 can also be delivered to first dispensing tap 55 for non gas-infused beverage driven by at least a portion of the gas from food grade gas source 5. In the present disclosure, pump 40 is added in the system instead of driving the beverage with only pressurized gas. This allows for lower operation pressures than a non-pump version and two different styles of beverages can be produced from one pressurizable container. Adding a pump can introduce problems that arise when either gas or beverage are exhausted that could result in material damage. Safety cutoff switches installed on the beverage and gas tubes protect the electromechanical components of the system by monitoring aspects of the dispensation system such as (but not limited to) flow rate of beverage and gas pressure.

However, when the pressure in system 100 is high enough to drive the preprocessed beverage to tap 55 or to gas infusion vessel, pump 40 is optional. For example, the pressure after third pressure regulator 25 is 15 psi, and the pressure after second pressure regulator is 32 psi. The pressure of the gas after third pressure regulator 35 can push non gas-infused beverage from pressurizable container 30 to tap 55, and can push non gas-infused beverage from pressurizable container 30 to gas infusion vessel 45 to infuse the gas after second pressure regulator.

In the present disclosure, a pump can be optional when the pressure in system 100 is high enough to drive the preprocessed beverage to tap 55 or to gas infusion vessel. When there is no pump 40 in system 100, the pressure of gas after third pressure regulator is required to be high enough to drive the non gas-infused beverage from pressurizable container 30 to gas infusion vessel 45, and therefore the pressure after third pressure regulator may be higher than the pressure of gas after second pressure regulator 20. Fourth pressure regulator may be required for dispensing non gas-infused beverage in this embodiment because the operation pressure of system 100 is not low any more.

In the present disclosure, when the operation pressure in the pressurized container 30 is increased, non gas-infused beverage may become reduced gas-infused beverage. However, the reduced gas-infused beverage can still form the non-foaming gas-infused beverage.

In the present disclosure, non gas-infused beverage tube 123 can be disconnected from non gas-infused beverage tube 127. Accordingly, no non gas-infused beverage can be dispensed from first dispensing tap 55, and only gas-infused beverage will be dispensed from second dispensing tap 60.

In the present disclosure, the beverage includes, but is not limited to, coffee, water, tea, beer and any other drinks. The gas includes, but is not limited to, carbon dioxide and nitrogen that can be infused with the above beverage.

It should be noted that the terms "first", "second", "third", "fourth", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure will not be limited to the particular embodiment(s) disclosed as the best mode contemplated, but that the disclosure will include all embodiments falling within the scope of the appended claims.

What is claimed is:

1. A system to prepare and dispense both non gas-infused and gas-infused beverages comprising:
    a gas source;
    a pressurizable container connected to the gas source to receive a first flow of gas from the gas source, the pressurizable container being a sealable receptacle that holds liquid;
    a gas infusion tank connected to the gas source to receive a second flow of gas from the gas source;
    a first dispensing tap that receives a portion of preprocessed beverage stored in the pressurizable container that flows under pressure applied from a portion of the first flow of gas to dispense a non gas-infused beverage from the first dispensing tap;
    a second dispensing tap that receives gas-infused beverage from the gas infusion tank to dispense the gas-infused beverage by the second dispensing tap, the gas infusion tank receiving a portion of the preprocessed beverage from the pressurizable container to infuse the preprocessed beverage in the gas infusion tank with at least a portion of the second flow of gas; and
    a pressure regulator to regulate a pressure of the gas directly to the gas infusion tank and another pressure regulator to regulate a pressure of gas directly to the pressurizable container,
    wherein a pressure of gas after the pressure regulator is higher than a pressure of gas after the another pressure regulator,
    wherein the non gas-infused beverage has a lower concentration of gas than the gas-infused beverage.

2. The system according to claim 1, wherein the system is located in a refrigeration cabinet to cool down both the non gas-infused and gas-infused beverages.

3. The system according to claim 1, further comprising a pump to drive preprocessed beverage from the pressurizable container to the gas infusion tank connected between the pressurizable container and the gas infusion tank.

4. A system to prepare and dispense both non gas-infused and gas-infused beverages comprising:
    a gas source;
    a pressurizable container connected to the gas source to receive a first flow of gas from the gas source;
    a gas infusion tank connected to the gas source to receive a second flow of gas from the gas source;
    a first dispensing tap that receives a portion of preprocessed beverage stored in the pressurizable container that flows under pressure applied from a portion of the first flow of gas to dispense a non gas-infused beverage from the first dispensing tap;
    a second dispensing tap that receives gas-infused beverage from the gas infusion tank to dispense the gas-infused beverage by the second dispensing tap, the gas infusion tank receiving a portion of the preprocessed beverage from the pressurizable container to infuse the preprocessed beverage in the gas infusion tank with at least a portion of the second flow of gas; and
    a first cutoff switch that is low gas cutoff switch that determines the pressure of gas higher or lower than a pre-determined pressure, wherein the first cutoff switch is connected between the gas source and the pressurizable container, and
    wherein the non gas-infused beverage has a lower concentration of gas than the gas-infused beverage.

5. A system to prepare and dispense both non gas-infused and gas-infused beverages comprising:
    a gas source;
    a pressurizable container connected to the gas source to receive a first flow of gas from the gas source;
    a gas infusion tank connected to the gas source to receive a second flow of gas from the gas source;
    a first dispensing tap that receives a portion of preprocessed beverage stored in the pressurizable container that flows under pressure applied from a portion of the first flow of gas to dispense a non gas-infused beverage from the first dispensing tap;
    a second dispensing tap that receives gas-infused beverage from the gas infusion tank to dispense the gas-infused beverage by the second dispensing tap, the gas infusion tank receiving a portion of the preprocessed beverage from the pressurizable container to infuse the preprocessed beverage in the gas infusion tank with at least a portion of the second flow of gas; and
    a cutoff switch that is a low fluid detection cutoff switch to determine if a flow rate of the preprocessed beverage is higher or lower than a pre-determined flow rate, wherein the cutoff switch is between the pressurizable container and a pump, and wherein the non gas-infused beverage has a lower concentration of gas than the gas-infused beverage.

6. The system according to claim 1, further comprising a first pressure regulator to regulate a pressure of the gas directly from the gas source.

7. The system according to claim 1, further comprising a low tank sensor and a full tank sensor that can indicate a level of the gas-infused beverage in the gas infusion tank.

8. The system according to claim 1, further comprising a beverage sink, a removable beverage sink cover with slots and a plurality of non-splash drain reliefs.

9. The system according to claim 1, further comprising a plurality of tubes that can be rated flexible plastic tubing that connect one or more of the gas source, the pressurizable container, the gas infusion tank, the first dispensing tap, and the second dispensing tap.

10. The system according to claim 1, wherein the pressurizable container has a pressure relief valve to relieve the pressure before the pressurizable container is disconnected from system.

11. The system according to claim 1, wherein the second dispensing tap comprises a diffuser to cause foaming from the gas-infused beverage and wherein the first dispensing tap does not comprise a diffuser.

12. A method of preparing and dispensing both non gas-infused and gas-infused beverages, comprising:
   preparing non gas-infused beverage from at least a part of preprocessed beverage stored in a pressurizable container driven by at least a portion of gas from a gas source, the pressurizable container being a sealable receptacle that holds liquid;
   delivering the non gas-infused beverage to a first dispensing tap through a first plurality of tubes;
   driving at least a portion of preprocessed beverage stored in the pressurizable container to a gas infusion tank through a plurality of tubes;
   preparing gas-infused beverage by infusing the preprocessed beverage with at least a portion of gas from the gas source in the gas infusion tank; and
   delivering the gas-infused beverage to a second dispensing tap through a second plurality of tubes,
   wherein a pressure of gas into the gas infusion tank after a pressure regulator is higher than a pressure of gas into the pressurizable container after another pressure regulator.

13. The method according to claim 12, wherein pressure of gas from the gas source and preprocessed beverage in the first and second pluralities of tubes are regulated by a plurality of pressure regulators.

14. The method according to claim 12, further comprising cooling down both the non gas-infused and gas-infused beverages in a refrigeration cabinet before dispensing.

15. A method of preparing and dispensing both non gas-infused and gas-infused beverages, comprising:
   preparing non gas-infused beverage from at least a part of preprocessed beverage stored in a pressurizable container driven by at least a portion of gas from a gas source, the pressurizable container being a sealable receptacle that holds liquid;
   delivering the non gas-infused beverage to a first dispensing tap through a first plurality of tubes;
   driving at least a portion of preprocessed beverage stored in the pressurizable container to a gas infusion tank through a plurality of tubes;
   preparing gas-infused beverage by infusing the preprocessed beverage with at least a portion of gas from the gas source in the gas infusion tank; and
   delivering the gas-infused beverage to a second dispensing tap through a second plurality of tubes, wherein driving the non gas-infused beverage stored in the pressurizable container to a gas infusion tank through a plurality of tubes is executed by a pump, and wherein operation of the pump is controlled by a first cutoff switch and a second cutoff switch.

16. The method according to claim 15, wherein the operation of the pump is further controlled by a low tank sensor and a full tank sensor based on the amount of beverage in the gas infusion tank.

* * * * *